United States Patent

Matsushita et al.

(10) Patent No.: US 11,220,563 B2
(45) Date of Patent: Jan. 11, 2022

(54) PRODUCTION METHOD FOR HYDROGENATED PETROLEUM RESIN

(71) Applicant: Maruzen Petrochemical Co., Ltd., Chuo-ku (JP)

(72) Inventors: Keisuke Matsushita, Ichihara (JP); Yoshikazu Iizima, Ichihara (JP); Tomoki Hayashi, Ichihara (JP)

(73) Assignee: Maruzen Petrochemical Co., Ltd., Chuo-ku (JP)

( * ) Notice: Subject to any disclaimer, the term of this patent is extended or adjusted under 35 U.S.C. 154(b) by 113 days.

(21) Appl. No.: 16/493,920

(22) PCT Filed: Mar. 8, 2018

(86) PCT No.: PCT/JP2018/009053
§ 371 (c)(1),
(2) Date: Sep. 13, 2019

(87) PCT Pub. No.: WO2018/168654
PCT Pub. Date: Sep. 20, 2018

(65) Prior Publication Data
US 2020/0385498 A1    Dec. 10, 2020

(30) Foreign Application Priority Data

Mar. 16, 2017   (JP) .............................. JP2017-051104

(51) Int. Cl.
*C08F 32/08*    (2006.01)
*C08K 3/34*    (2006.01)

(52) U.S. Cl.
CPC .............. *C08F 32/08* (2013.01); *C08K 3/346* (2013.01)

(58) Field of Classification Search
CPC ................................ C08F 32/08; C08K 3/346
See application file for complete search history.

(56) References Cited

U.S. PATENT DOCUMENTS 5,171,793 A * 12/1992  Johnson ................ C08F 240/00
                                                     525/332.1
5,502,140 A     3/1996  Daughenbaugh et al.
5,739,239 A *   4/1998  Daughenbaugh ..... C08F 232/08
                                                     526/283
6,184,308 B1    2/2001  Daughenbaugh et al.
2002/0107332 A1 8/2002  Klosiewicz et al.

FOREIGN PATENT DOCUMENTS

| CN | 2004-515618 A | 5/2004 |
| JP | 63-35642 A | 2/1988 |
| JP | 2-51502 A | 2/1990 |
| JP | 6-56920 A | 3/1994 |
| JP | 8-208763 A | 8/1996 |
| JP | 2005-272475 A | 10/2005 |
| JP | 2007-56024 A | 3/2007 |
| JP | 2019-505946 A | 3/2018 |
| WO | WO 91/13106 A1 | 9/1991 |
| WO | WO 02/48221 A1 | 6/2002 |

OTHER PUBLICATIONS

Extended European Search Report dated Dec. 10, 2020 in European Patent Application No. 18767510.3, 8 pages.
International Search Report dated Jun. 12, 2018 in PCT/JP2018/009053 filed Mar. 8, 2018.
Office Action dated Sep. 29, 2021, in Japanese Patent Application No. 2019-505946 filed Mar. 8, 2018 (with English translation).

* cited by examiner

*Primary Examiner* — Robert D Harlan
(74) *Attorney, Agent, or Firm* — Oblon, McClelland, Maier & Neustadt, L.L.P.

(57) ABSTRACT

To provide a novel production method for a hydrogenated petroleum resin that does not cause filter clogging and is also capable of suppressing a significant decrease in catalytic activity in hydrogenation in a production method for a dicyclopentadiene/vinyl aromatic compound-based hydrogenated resin to be used as a tackifier. A production method for a dicyclopentadiene/vinyl aromatic compound-based hydrogenated petroleum resin, in which a reaction product obtained by reacting a dicyclopentadiene with a vinyl aromatic compound is subjected to thermal polymerization, thereby obtaining a thermal polymerization reaction product, followed by hydrogenation thereof, characterized in that as the thermal polymerization reaction product, an oligomer-removed thermal polymerization reaction product obtained by removing a dicyclopentadiene oligomer from the thermal polymerization reaction product is used as a hydrogenation raw material.

20 Claims, No Drawings

PRODUCTION METHOD FOR HYDROGENATED PETROLEUM RESIN

TECHNICAL FIELD

The present invention relates to a production method for a dicyclopentadiene/vinyl aromatic compound-based hydrogenated petroleum resin, more particularly relates to use of a material obtained by removing a dicyclopentadiene oligomer as a raw material to be hydrogenated.

BACKGROUND ART

A dicyclopentadiene/vinyl aromatic compound-based hydrogenated petroleum resin obtained by hydrogenating a thermal polymerization reaction product of a dicyclopentadiene and a vinyl aromatic compound is useful as a raw material (tackifier) of a hot-melt adhesive or the like.

It is known that in the production of the hydrogenated petroleum resin described above, in order to allow the vinyl aromatic compound and the dicyclopentadiene to react with each other with a high selectivity for a phenylnorbornene derivative, the reaction temperature is preferably from 170 to 190° C., and if the reaction temperature is 190° C. or lower, an increase in molecular weight due to a reaction of the phenylnorbornene derivative or generation of a homopolymer or the like of the vinyl aromatic compound is suppressed, and the selectivity for the phenylnorbornene derivative is enhanced.

On the other hand, it is known that when the reaction of the vinyl aromatic compound with the dicyclopentadiene is performed in a temperature range of 245° C. or lower, a dicyclopentadiene oligomer (hereinafter referred to as "DCPD oligomer") which becomes insoluble in almost all commonly used solvents at 25° C. is generated.

Then, when the DCPD oligomer is generated, there arises a problem that filter clogging is caused in the production of the hydrogenated petroleum resin.

It is also known that when the thermal polymerization reaction product obtained by the thermal polymerization reaction is hydrogenated using a palladium-supported catalyst while allowing the DCPD oligomer to exist, a significant decrease in catalytic activity is caused.

PTL 1 indicates that a slight haze appears in a polymerization solution after a raw material is sent to a reactor at 245° C. and maintained at 265° C. for 120 minutes in a thermal polymerization reaction. This haze is due to a small amount of a dicyclopentadiene wax crystal (DCPD oligomer) in the solution, and this waxy crystal causes filter clogging in the production step. It is also reported that the waxy haze is reduced by extending the maintaining time of this thermal polymerization reaction to 140 minutes.

PTL 2 indicates that a wax (DCPD oligomer) formed at a reaction temperature of 240° C. and 245° C. and in a short (2 hours or less) reaction time in homopolymerization of dicyclopentadiene is insoluble in almost all commonly used solvents and therefore is an undesirable substance, and the DCPD oligomer is reduced by setting the reaction time to 3 hours or more or setting the reaction temperature higher than 250° C.

In these conventional techniques, the DCPD oligomer is reduced by a method in which the reaction temperature of thermal polymerization is increased or a method in which the reaction time is increased in most cases. However, even by the above-mentioned method, a small amount of the DCPD oligomer remains, and the problem is not solved in terms of filter clogging or a decrease in catalytic activity.

CITATION LIST

Patent Literature

PTL 1: JP-T-2004-515618
PTL 2: JP-A-08-208763

SUMMARY OF INVENTION

Technical Problem

The present invention has been made in view of such problems, and an object thereof is to provide a novel production method for a hydrogenated petroleum resin that does not cause filter clogging during production and is also capable of suppressing a significant decrease in catalytic activity in a hydrogenation reaction in a production method for a dicyclopentadiene/vinyl aromatic compound-based hydrogenated resin to be used as a tackifier.

Solution to Problem

The present inventors conducted intensive studies to solve the above-mentioned problems, and as a result, they found that when a DCPD oligomer is removed from a thermal polymerization reaction product of a dicyclopentadiene and a vinyl aromatic compound, and the resulting material is used as a hydrogenation raw material in a production method for a dicyclopentadiene/vinyl aromatic compound-based hydrogenated resin, a decrease in catalytic activity in a hydrogenation step can be suppressed, and further, a hydrogenated petroleum resin that is favorable as a tackifier can be produced without causing filter clogging during production, and thus completed the present invention.

That is, the present invention is a production method for a dicyclopentadiene/vinyl aromatic compound-based hydrogenated petroleum resin, in which a reaction product obtained by reacting a dicyclopentadiene with a vinyl aromatic compound is subjected to thermal polymerization, thereby obtaining a thermal polymerization reaction product, followed by hydrogenation thereof, characterized in that as the thermal polymerization reaction product, an oligomer-removed thermal polymerization reaction product is obtained by removing a DCPD oligomer from the thermal polymerization reaction product and used as a hydrogenation raw material.

Further, the present invention is the above-mentioned production method, wherein the hydrogenation raw material is a material obtained by cooling the thermal polymerization reaction product to 10 to 40° C., and removing the DCPD oligomer by performing solid-liquid separation of the resulting deposited material.

Further, the present invention is the above-mentioned production method, wherein the hydrogenation raw material is a material obtained by removing the DCPD oligomer by bringing an adsorbent into contact with the dicyclopentadiene oligomer in the thermal polymerization reaction product.

Still further, the present invention is the above-mentioned production method, wherein the adsorbent is at least one type selected from the group consisting of activated clay, silica gel, silica-alumina, activated alumina, activated carbon, zeolite, and diatomaceous earth.

Yet still further, the present invention is the above-mentioned production method, wherein the hydrogenation raw material has a turbidity at 25° C. of 12 NTU or less.

Further, the present invention is the above-mentioned production method, wherein a palladium-supported catalyst is used in the hydrogenation reaction.

Advantageous Effects of Invention

According to the production method for a dicyclopentadiene/vinyl aromatic compound-based hydrogenated petroleum resin of the present invention, hydrogenation is performed for a raw material from which a DCPD oligomer is removed, and therefore, a decrease in catalytic activity in a hydrogenation step can be suppressed, and further, filter clogging due to a DCPD oligomer can also be avoided, and thus, a dicyclopentadiene/vinyl aromatic compound-based hydrogenated petroleum resin that is favorable as a tackifier can be industrially advantageously produced.

DESCRIPTION OF EMBODIMENTS

The production method for a dicyclopentadiene/vinyl aromatic compound-based hydrogenated petroleum resin of the present invention (hereinafter referred to as "the production method of the present invention") is configured such that a reaction product obtained by reacting a dicyclopentadiene with a vinyl aromatic compound is subjected to thermal polymerization, thereby obtaining a thermal polymerization reaction product, followed by hydrogenation thereof, wherein as the thermal polymerization reaction product at this time, an oligomer-removed thermal polymerization reaction product obtained by removing a DCPD oligomer from the thermal polymerization reaction product is used as a hydrogenation raw material.

(Reaction Product Obtained by Reacting Dicyclopentadiene with Vinyl Aromatic Compound)

The dicyclopentadiene to be used in the production method of the present invention is not particularly limited as long as it contains dicyclopentadiene, and for example, high-purity dicyclopentadiene or an unrefined dicyclopentadiene fraction, which contains approximately 40 to 100 mass % of dicyclopentadiene, 0 to 30 mass % of a codimer of cyclopentadiene and another diene (such as methyl cyclopentadiene, isoprene, or piperylene) (hereinafter sometimes referred to as "C10$_+$"), 0 to 40 mass % of C5 and C6 paraffins, and 0 to 20 mass % of C5 and C6 olefins can be used. In addition, a mixture of dicyclopentadiene and cyclopentadiene can also be used.

Among such dicyclopentadienes, in terms of the yield of a thermal polymerization reaction product obtained by thermal polymerization in the latter stage, it is preferred to use a dicyclopentadiene having a high concentration of a reactive component such as dicyclopentadiene or a codimer, however, an unrefined dicyclopentadiene fraction which contains non-reactive components such as C5 and C6 paraffins and is inexpensive can also be used.

As the unrefined dicyclopentadiene fraction containing C5 and C6 paraffins, an unrefined dicyclopentadiene fraction containing 50 to 85 mass % of dicyclopentadiene and 5 to 30 mass % in total of C5 and C6 paraffins is preferred, and an unrefined dicyclopentadiene fraction containing 60 to 80 mass % of dicyclopentadiene and 10 to 25 mass % in total of C5 and C6 paraffins is more preferred. Note that the balance includes other components (such as C5 and C6 olefins and C10$_+$) in the unrefined dicyclopentadiene fraction.

Further, the reaction of the dicyclopentadiene with the vinyl aromatic compound can be performed without using a solvent, however, when an unrefined dicyclopentadiene fraction obtained from a thermal decomposition apparatus such as naphtha is used, the concentration of dicyclopentadiene largely varies depending on an operation, and therefore, in order to keep the quality of the resin among lots uniform, a composition may be adjusted by adding a solvent to the unrefined dicyclopentadiene fraction. In this case, the solvent is used for adjusting the composition, and therefore, the used amount thereof may be extremely small as compared with a conventional method in which the solvent is used as a polymerization solvent, and is generally 10 mass % or less with respect to the unrefined dicyclopentadiene fraction.

As such a solvent, for example, an aromatic solvent such as benzene, toluene, or xylene; a naphthenic solvent such as cyclohexane, dimethylcyclohexane, or ethylcyclohexane; or the like can be favorably used.

Further, the vinyl aromatic compound to be used in the production method of the present invention is not particularly limited, but for example, a vinyl aromatic compound represented by the following formula (1) is preferred.

[Chem. 1]

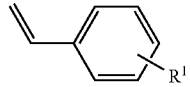

(1)

In the above formula (1), R$^1$ represents a hydrogen atom, an alkyl group, a cycloalkyl group, an aryl group, or an aralkyl group, and is preferably a hydrogen atom. The alkyl group represented by R$^1$ is preferably an alkyl group having 1 to 10 carbon atoms, more preferably an alkyl group having 1 to 7 carbon atoms. Further, the alkyl group may be linear or branched, and examples thereof include a methyl group, an ethyl group, an n-propyl group, an isopropyl group, an n-butyl group, an isobutyl group, a sec-butyl group, a tert-butyl group, an n-pentyl group, an isopentyl group, a neopentyl group, an n-hexyl group, an isohexyl group, and an n-heptyl group. Further, the cycloalkyl group is preferably a cycloalkyl group having 3 to 7 carbon atoms, and examples thereof include a cyclopentyl group, a cyclohexyl group, and a cycloheptyl group. Further, examples of the aryl group include an aryl group having 6 to 12 carbon atoms such as a phenyl group, a tolyl group, a xylyl group, and a naphthyl group. Further, examples of the aralkyl group include an aralkyl group having 7 to 20 carbon atoms such as a benzyl group, a phenethyl group, and a naphthylmethyl group.

Specific examples of the vinyl aromatic compound to be used in the production method of the present invention include styrene, p-methylstyrene, and p-tert-butylstyrene, and styrene is preferred. Note that in the vinyl aromatic compound, a stabilizer such as a polymerization inhibitor may be included.

The reaction product obtained by the reaction of the dicyclopentadiene with the vinyl aromatic compound (hereinafter referred to as "preliminary reaction") in the production method of the present invention contains a phenylnorbornene derivative.

Specific examples of this phenylnorbornene derivative include a phenylnorbornene derivative represented by the following formula (2) obtained by the reaction of the dicyclopentadiene with the vinyl aromatic compound represented by the above formula (1).

[Chem. 2]

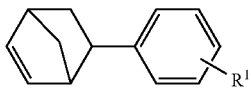

(2)

In the above formula (2), $R^1$ represents a hydrogen atom, an alkyl group, a cycloalkyl group, an aryl group, or an aralkyl group, and is preferably a hydrogen atom. The alkyl group represented by $R^1$ is preferably an alkyl group having 1 to 10 carbon atoms, more preferably an alkyl group having 1 to 7 carbon atoms. Further, the alkyl group may be linear or branched, and examples thereof include a methyl group, an ethyl group, an n-propyl group, an isopropyl group, an n-butyl group, an isobutyl group, a sec-butyl group, a tert-butyl group, an n-pentyl group, an isopentyl group, a neopentyl group, an n-hexyl group, an isohexyl group, and an n-heptyl group. Further, the cycloalkyl group is preferably a cycloalkyl group having 3 to 7 carbon atoms, and examples thereof include a cyclopentyl group, a cyclohexyl group, and a cycloheptyl group. Further, examples of the aryl group include an aryl group having 6 to 12 carbon atoms such as a phenyl group, a tolyl group, a xylyl group, and a naphthyl group. Further, examples of the aralkyl group include an aralkyl group having 7 to 20 carbon atoms such as a benzyl group, a phenethyl group, and a naphthylmethyl group.

Further, in the preliminary reaction, it is important that the phenylnorbornene derivative is generated and a polymer including a homopolymer of the vinyl aromatic compound is little generated (preferably, such a polymer is not substantially generated), and therefore, the selectivity for the phenylnorbornene derivative in the preliminary reaction is preferably 90% or more, more preferably 95% or more, further more preferably 97% or more, particularly preferably 99% or more.

By allowing the vinyl aromatic compound and the dicyclopentadiene to react with each other at such a high selectivity for the phenylnorbornene derivative, even if an unreacted vinyl aromatic compound remains after completion of the preliminary reaction, an increase in molecular weight and polydispersion of the thermal polymerization reaction product in thermal polymerization in the latter stage can be suppressed, and therefore, it is not necessary that the conversion ratio of the vinyl aromatic compound in the preliminary reaction be so high, and it may be approximately 50% or more.

Note that the conversion ratio of the vinyl aromatic compound and the selectivity for the phenylnorbornene derivative are calculated by the following formulae. Further, the residual amount of the vinyl aromatic compound and the generated amount of the phenylnorbornene derivative can be generally obtained by gas chromatography.

Conversion ratio (%)=[[Charged amount (mol) of vinyl aromatic compound−Residual amount (mol) of vinyl aromatic compound]/[Charged amount (mol) of vinyl aromatic compound]×100

Selectivity (%)=[[Generated amount (mol) of phenylnorbornene derivative]/[Charged amount (mol) of vinyl aromatic compound−Residual amount (mol) of vinyl aromatic compound]]×100

In order to allow the vinyl aromatic compound and the dicyclopentadiene to react with each other at such a high selectivity for the phenylnorbornene derivative, it is preferred to allow the vinyl aromatic compound and the dicyclopentadiene to react with each other in a temperature range of 170 to 190° C. When the reaction temperature is set to 170° C. or higher, the dicyclopentadiene is sufficiently thermally decomposed and the reaction easily proceeds and therefore, the phenylnorbornene derivative is efficiently generated. In addition, when the reaction temperature is set to 190° C. or lower, an increase in molecular weight due to a reaction of the phenylnorbornene derivative or generation of a homopolymer or the like of the vinyl aromatic compound is suppressed, and thus the selectivity for the phenylnorbornene derivative is enhanced.

Further, from the viewpoint that the concentration of the vinyl aromatic compound in the reaction system is set low and generation of a homopolymer of the vinyl aromatic compound is suppressed, it is preferred to perform the preliminary reaction by adding a liquid containing the vinyl aromatic compound dropwise (addition in a divided manner or addition in a continuous manner) to the dicyclopentadiene heated to the above-mentioned temperature range.

Specifically, it is preferred that a predetermined amount of the dicyclopentadiene is charged into a reaction vessel in advance and heated to the above-mentioned reaction temperature, and thereafter, a liquid containing the vinyl aromatic compound is added dropwise thereto in a divided manner or in a continuous manner to allow the reaction to proceed in a state where the temperature is maintained.

The liquid to be added dropwise (hereinafter referred to as "dropping liquid") may be a liquid containing only the vinyl aromatic compound or may contain the vinyl aromatic compound and the dicyclopentadiene. Further, the dicyclopentadiene to be charged into a reaction vessel in advance and the dicyclopentadiene to be used in the dropping liquid may have the same composition or a different composition.

The ratio of the used amounts of the dicyclopentadiene to be charged into a reaction vessel in advance and the dropping liquid or the ratio of the used amounts of the dicyclopentadiene and the vinyl aromatic compound in the dropping liquid when the dropping liquid contains the dicyclopentadiene is appropriately set according to a target value of the aromatic content in the reaction product to be obtained, however, the used amount of the dropping liquid is preferably in a range of 20 to 150 mass % with respect to 100 mass % of the charged amount into the reaction vessel. When the used amount of the dropping liquid is set to 20 mass or more, the aromatic content in the reaction product to be obtained becomes a sufficient amount. In addition, when the used amount of the dropping liquid is set to 150 mass % or less, the concentration of the vinyl aromatic compound during dropwise addition becomes low, and moreover, a local increase in temperature due to reaction heat is suppressed, and therefore, a decrease in selectivity for the phenylnorbornene derivative can be prevented.

Further, the ratio (mass ratio) of the vinyl aromatic compound and the entire dicyclopentadiene to be supplied to the reaction system can be appropriately selected according to a target value of the aromatic content in the reaction product to be obtained, and is generally from 5/95 to 60/40, preferably from 10/90 to 50/50, more preferably from 15/85 to 40/60, particularly preferably from 20/80 to 30/70.

A time for dropwise addition is preferably from 1 to 4 hours. When the dropping time is set to 1 hour or more, the concentration of the vinyl aromatic compound in the reaction system becomes low, and moreover, a rapid increase in temperature due to reaction heat is suppressed, and therefore, a decrease in selectivity for the phenylnorbornene derivative can be prevented. According to this, a homopolymer is less easily generated in the subsequent thermal polymerization. In addition, when the dropping time is set to 4 hours or less, homopolymerization of the cyclopentadiene becomes difficult to proceed, and a polymer is less easily formed in the subsequent thermal polymerization.

Further, it is preferred to perform the dropwise addition while stirring the inside of the reaction system so that the temperature in the reaction vessel is kept uniform and the concentration of the vinyl aromatic compound is not locally increased during the dropwise addition.

(Thermal Polymerization Reaction Product)

The thermal polymerization reaction product is obtained by heating the reaction product containing the phenylnorbornene derivative obtained by the preliminary reaction to a temperature of 240 to 300° C. to perform thermal polymerization. When the polymerization temperature is lower than 240° C., the polymerization rate is significantly decreased. In addition, when the polymerization temperature exceeds 300° C., the polymerization rate is significantly increased.

The polymerization temperature of the thermal polymerization is preferably from 250 to 280° C. from the viewpoint of such a polymerization rate. Note that a polymerization time is preferably from 0.5 to 4 hours, more preferably from 1 to 3 hours.

The thermal polymerization can be carried out in the absence of a solvent, and can be performed by heating the reaction product to the polymerization temperature while maintaining the reaction product in the reaction vessel used in the preliminary reaction. Further, the thermal polymerization may also be performed by transferring the reaction product obtained by the preliminary reaction to another polymerization vessel.

When the reaction product in the reaction vessel used in the preliminary reaction is heated to the polymerization temperature, a temperature increasing rate is preferably 1.5° C./min or more in terms of preventing an increase in molecular weight of the thermal polymerization reaction product to be obtained by thermal polymerization.

(Hydrogenation Raw Material)

The raw material to be hydrogenated in the production method of the present invention is a material obtained by removing the DCPD oligomer from the thermal polymerization reaction product (hereinafter referred to as "hydrogenation raw material" for short), and examples of a method for removing the DCPD oligomer from the thermal polymerization reaction product include a method in which a deposited material in the thermal polymerization reaction product is subjected to solid-liquid separation, and a method in which an adsorbent is brought into contact with the DCPD oligomer in the thermal polymerization reaction product.

Before the DCPD oligomer is removed from the thermal polymerization reaction product, an unreacted monomer component and a low molecular weight polymer in the thermal polymerization reaction product may be separated or removed. There is no particular limitation on a method for separating or removing the monomer component or the like, however, for example, the monomer component or the like is preferably separated or removed by a rotary evaporator, a flash distillation apparatus, a thin film evaporator, or the like.

Further, before the DCPD oligomer is removed from the thermal polymerization reaction product, the thermal polymerization reaction product may be diluted by adding a solvent thereto, and as such a solvent, for example, an aromatic solvent such as benzene, toluene, or xylene; a naphthenic solvent such as cyclohexane, dimethylcyclohexane, or ethylcyclohexane; or the like can be favorably used.

The concentration of the thermal polymerization reaction product after adding the solvent is preferably 50 mass % (hereinafter simply referred to as "%") or less, more preferably 20% or less. When the concentration exceeds 50%, the viscosity is high and solid-liquid separation of the DCPD oligomer becomes difficult, and therefore, the concentration or the viscosity is preferably to be low. However, when the concentration is too low, the production efficiency is decreased, and also the selectivity is decreased in the hydrogenation reaction, and therefore, the concentration of the thermal polymerization reaction product is preferably to be about 15%.

A method for removing the DCPD oligomer by solid-liquid separation of the deposited material described above is preferably a method in which the thermal polymerization reaction product is cooled to 10 to 40° C., and the resulting deposited material is subjected to solid-liquid separation. When the temperature of the thermal polymerization reaction product exceeds 40° C., a part of the DCPD oligomer is dissolved, and the DCPD oligomer is deposited after solid-liquid separation, resulting in deterioration of the removing efficiency. On the other hand, when the temperature of the thermal polymerization reaction product is lower than 10° C., the viscosity is increased, and therefore, the removing efficiency is deteriorated.

Further, there is no particular limitation on the method for solid-liquid separation described above, and examples thereof include a method in which the thermal polymerization reaction product is left to stand so as to allow the DCPD oligomer to naturally sediment, and a method in which a filtration apparatus, a centrifugal sedimentation separator, a sedimentation apparatus, or the like is used, and these methods may be combined. Incidentally, examples of the filtration apparatus include a cross flow filtration apparatus and a celite filter apparatus, examples of the centrifugal sedimentation separator include a separation plate-type centrifugal sedimentation separator and a decanter-type centrifugal sedimentation machine, and examples of the sedimentation apparatus include a continuous thickener. Among these, as an apparatus capable of efficiently and continuously performing a treatment without using an auxiliary material, a separation plate-type centrifugal sedimentation separator is preferred.

A method for removing the DCPD oligomer by bringing an adsorbent into contact with the thermal polymerization reaction product described above is preferably a method in which the thermal polymerization reaction product is heated to about 120° C., and an adsorbent is brought into contact therewith. This is because the temperature at which the DCPD oligomer is completely dissolved is 120° C. or higher, and when the temperature of the thermal polymerization reaction product is lower than 120° C., the DCPD oligomer is not completely dissolved, and the adsorption efficiency is deteriorated.

There is no particular limitation on a method for bringing the adsorbent into contact with the DCPD oligomer in the thermal polymerization reaction product, but it is preferred to use, for example, a batch-type reactor or a flow-type continuous reactor such as a fixed bed flow reactor, or the like.

Further, there is no particular limitation on the adsorbent, and examples thereof include activated clay, silica gel, silica-alumina, activated alumina, activated carbon, zeolite, and diatomaceous earth, and among these, activated alumina is preferred. Further, as the activated alumina, spherical activated alumina in a particulate form with a size of 2 to 4 mm is particularly preferred.

Note that the DCPD oligomer affects the decrease in catalytic activity in the hydrogenation step, and therefore, the amount of the DCPD oligomer is preferably reduced as much as possible. Therefore, the turbidity of the hydrogenation raw material after removing the DCPD oligomer is preferably as low as possible. However, in order to decrease the turbidity of the hydrogenation raw material, it is necessary to decrease the efficiency of the step of removing the DCPD oligomer, and therefore, the turbidity of the hydrogenation raw material is preferably set to 12 NTU or less at 25° C. in consideration of the balance with the decrease in catalytic activity. Note that in the case where the DCPD oligomer is not removed, the turbidity when the concentration of the thermal polymerization reaction product (resin concentration) after adding a solvent is 15% is 24 NTU. However, in the case where the turbidity exceeds 12 NTU, the residual amount of an insoluble component is large, and therefore, pump clogging is likely to occur in the production step, and also the catalytic activity decreasing rate in the hydrogenation step becomes high, and thus such a case is not preferred.

(Hydrogenation Step)

The hydrogenation step in the production method of the present invention is a step of hydrogenating the hydrogenation raw material in the presence of a catalyst, and by this step, a dicyclopentadiene/vinyl aromatic compound-based hydrogenated petroleum resin (hereinafter referred to as "hydrogenated petroleum resin") can be obtained.

There is no particular limitation on a method for hydrogenating the hydrogenation raw material, and a batch-type reactor, a flow-type continuous reactor, or the like can be used.

When a batch-type reactor is used, as for reaction conditions, a temperature is generally from 200 to 300° C., preferably from 200 to 270° C., a reaction pressure is generally from 0 to 10 MPaG (G represents a gauge pressure, and the same applies hereinafter), preferably from 1 to 7 MPaG, and a reaction time is generally from 0.5 to 8 hours, preferably from 1 to 5 hours.

Further, when a flow-type continuous reactor is used, generally, a fixed bed flow reactor, preferably a trickle flow-type reactor using a liquid-gas co-current flow can be used. As for reaction conditions, a temperature is generally from 100 to 300° C., preferably from 120 to 250° C., a reaction pressure is generally from 0 to 10 MPaG, preferably from 1 to 5 MPaG, and an LHSV (liquid hourly space velocity) is generally from 2.0 to 12.0 $[h^{-1}]$, preferably from 5.0 to 12.0 $[h^{-1}]$. Note that there is no limitation on the number of flow reactors, and it is also possible to perform hydrogenation in a divided manner using two or more towers.

As a catalyst to be used in the hydrogenation step, generally, a known catalyst such as a nickel, palladium, cobalt, platinum, or rhodium-based catalyst can be favorably used, and a nickel or palladium-based catalyst is preferred. In terms of the hue of the petroleum resin after hydrogenation, a palladium-based catalyst is more preferred. Specific examples of the catalyst include transition metal catalysts represented by, for example, nickel, palladium, cobalt, platinum, rhodium, etc. described above, and other than these, catalysts having these supported on an arbitrary carrier, and among these, a palladium-supported catalyst is preferred. Examples of the carrier include alumina, silica, silica-alumina, zeolite, a clay mineral (such as montmorillonite), and silicon carbide.

Further, the reaction in the hydrogenation step may be performed in the presence of a solvent. Examples of this solvent include naphthenic solvents such as cyclohexane, dimethylcyclohexane, and ethylcyclohexane.

By removing an unreacted monomer component, a low molecular weight polymer, or a volatile component such as a solvent from the hydrogenated petroleum resin obtained in the hydrogenation step as needed, a target hydrogenated petroleum resin can be obtained. There is no particular limitation on a method for separating or removing the monomer component or the like, and for example, a rotary evaporator, a flash distillation apparatus, a thin film evaporator, or the like can be favorably used.

EXAMPLES

Hereinafter, the present invention will be more specifically described with reference to Examples, however, the present invention is not limited thereto. Note that in Examples, compositions and the like are on a mass basis unless otherwise specified.

The physical properties and the like of the obtained resin were determined by the following methods.

(1) Molecular Weight Measurement

A molecular weight (a weight average molecular weight Mw, a number average molecular weight Mn, and a Z-average molecular weight Mz) and a molecular weight distribution (Mw/Mn) were determined as a polystyrene equivalent value using a high-speed GPC apparatus (HLC-8320GPC, manufactured by Tosoh Corporation) [eluent: tetrahydrofuran, column: G4000HXL, G3000HXL, and G2000HXL (two columns) manufactured by Tosoh Corporation were connected in series and used, detector: RI, standard sample: polystyrene].

(2) Turbidity Measurement

In turbidity measurement, a turbidity meter (2100N) manufactured by HACH was used, and the measurement was performed by a 90-degree scattered light detector, a transmitted light detector, and a forward scattered light detector for tungsten lamp light. A calibration curve was created from a formazin standard liquid, and as a relative turbidity, a sample was converted to a turbidity in NTU unit. Further, as a pretreatment for the measurement sample, the DCPD oligomer was sufficiently deposited by cooling for 13 hours or more in a refrigerator at 8° C., and thereafter, the sample was maintained in a thermostat bath at 25° C. for 1 hour or more, and the turbidity was measured.

(3) Calculation Method for Catalytic Activity Decreasing Rate

By using a fixed bed flow-type continuous reactor, a first-stage hydrogenation reaction was carried out under the following conditions: a raw material having a resin concentration of 15 mass %, a temperature of 120° C., a pressure of 0.5 MPa, and a palladium-based catalyst. Specifically, a sample was collected at an outlet of the reactor every time the liquid was allowed to pass therethrough, a residual olefin concentration in the sample was measured by $^1$H-NMR, and a change in the residual olefin concentration with respect to the passing liquid amount was followed, whereby the catalytic activity decreasing rate was calculated. At this time, the residual olefin concentration in the sample was determined as follows. The collected sample was evaporated at 180° C. to remove the solvent and adjusted to 10 mass % with a deuterated chloroform solvent, thereafter $^1$H-NMR was measured, and a peak corresponding to hydrogen of the olefin moiety was calculated as area %.

Subsequently, the passing resin liquid amount per catalyst volume [t-resin/m$^3$-cat] was expressed on the horizontal axis and the concentration of the peak corresponding to the olefin measured by $^1$H-NMR [$^1$H-NMR area %] (residual olefin concentration) was expressed on the vertical axis, and a slope thereof was calculated as the catalytic activity decreasing rate [d($^1$H-NMR area %)/d(t-resin/m$^3$-cat)].

Here, when a decrease in catalytic activity occurs every time the liquid is allowed to pass therethrough, an olefin remains without being hydrogenated, and therefore, the value of the residual olefin is increased, and it is indicated that as the numerical value is larger, the catalyst is more likely to be deteriorated. It is found that the catalyst deterioration rate is high when the increment of the numerical value becomes large.

Example 1: Production Example of Hydrogenated Petroleum Resin (1)

<Solid-Liquid Separation by Natural Sedimentation>
(Preliminary Reaction and Thermal Polymerization)

In an autoclave having an internal volume of 10 L and equipped with a stirrer, 3600 g of a dicyclopentadiene fraction (concentration: 71 mass %) was charged, and the inside of the reaction system was replaced with nitrogen. Thereafter, the temperature was increased to 180° C. at a rate of 4° C./min while stirring at 500 rpm. A mixed solution of 1014 g of styrene and 986 g of the dicyclopentadiene fraction was added dropwise thereto over 2 hours in a state where the temperature was maintained at 180° C. After completion of the drop addition, the temperature was increased to 260° C. at a rate of 1.8° C./min. Thereafter, heating was continued at 260° C. for 92 minutes to perform a thermal polymerization reaction. By doing this, a thermal polymerization reaction product was obtained. The molecular weight of the resin at this time was Mz=1850 and Mw/Mn=2.26.

The thermal polymerization reaction product was treated using a rotary evaporator for 10 minutes at a temperature of 230° C. under a nitrogen gas stream, whereby an unreacted monomer was removed. Subsequently, a treatment was performed for 15 minutes at a temperature of 230° C. and a pressure of 6.7 kPaA (A represents an absolute pressure, and the same applies hereinafter), whereby a part of the low molecular weight material was removed.
(Removal of DCPD Oligomer by Solid-Liquid Separation through Natural Sedimentation)

The above-mentioned thermal polymerization reaction product was diluted to a concentration of 15.0 mass % by adding dimethylcyclohexane (hereinafter referred to as "DMCH") thereto. This diluted solution was cooled to a temperature of 25° C. to deposit a DCPD oligomer, and further left to stand overnight so as to allow the DCPD oligomer to naturally sediment, and a supernatant portion was separated and recovered and used as a hydrogenation raw material. The turbidity of this hydrogenation raw material at 25° C. was 0.56 NTU.
(Hydrogenation Step)

By using the above-mentioned hydrogenation raw material, two-stage continuous hydrogenation with a palladium-based catalyst was performed, whereby a hydrogenated petroleum resin was obtained. That is, the raw material as liquid was allowed to pass through a fixed bed flow reactor (gas-liquid co-current flow, downflow type) filled with a palladium-supported alumina catalyst, and a hydrogenation reaction was performed at a temperature of 120° C., a hydrogen pressure of 0.5 MPaG, and an LHSV of 17 [h$^{-1}$]. Further, by using the same fixed bed flow reactor, a hydrogenation reaction was performed at a temperature of 170° C., a hydrogen pressure of 0.5 MPaG, and an LHSV of 17 [h$^{-1}$].

After the hydrogenation reaction, this reaction liquid was taken out, and a treatment was performed using a rotary evaporator for 20 minutes at a temperature of 180° C. under a nitrogen gas stream, whereby the solvent was removed. Subsequently, a treatment was performed for 10 minutes at a temperature of 180° C. and a pressure of 6.7 kPaA, whereby a part of the low molecular weight material was removed.
(Catalytic Activity Decreasing Rate)

In the first-stage hydrogenation step, the residual olefin concentration when the passing resin liquid amount was 22.7 [t-resin/m$^3$-cat] was calculated to be 3.84 [$^1$H-NMR area %] and the residual olefin concentration when the passing resin liquid amount was 192.5 [t-resin/m$^3$-cat] was calculated to be 4.06 [$^1$H-NMR area %]. From these, the catalytic activity decreasing rate was estimated to be 0.0012 [($^1$H-NMR area %)/(t-resin/m$^3$-cat)]. The results are shown in the below-mentioned Table 1.

Comparative Example 1: Production Example of Hydrogenated Petroleum Resin (2)

A hydrogenated petroleum resin was produced in the same manner as in Example 1 except that the DCPD oligomer was not removed. Incidentally, the turbidity of the thermal polymerization reaction product was 24.0 NTU.
(Catalytic Activity Decreasing Rate)

In a step corresponding to the first-stage hydrogenation step in Example 1, the residual olefin concentration when the passing resin liquid amount was 21.5 [t-resin/m$^3$-cat] was calculated to be 2.63 [$^1$H-NMR area %] and the residual olefin concentration when the passing resin liquid amount was 118.7 [t-resin/m$^3$-cat] was calculated to be 2.88 [$^1$H-NMR area %]. From these, the catalytic activity decreasing rate was estimated to be 0.0026 [($^1$H-NMR area %)/(t-resin/m$^3$-cat)]. The results are shown in the below-mentioned Table 1.

Example 2: Production Example of Hydrogenated Petroleum Resin (3)

<Solid-Liquid Separation by Centrifugal Sedimentation>

A hydrogenated petroleum resin was produced in the same manner as in Example 1 except that the following solid-liquid separation by centrifugal sedimentation was performed as the method for removing the DCPD oligomer.
(Removal of DCPD Oligomer by Solid-Liquid Separation through Centrifugal Sedimentation)

A solution obtained by diluting the thermal polymerization reaction product to a concentration of 15.0 mass % by adding DMCH thereto was cooled to a temperature of 25° C. to deposit a DCPD oligomer, and treated with a centrifugal sedimentation separator (a plate-type centrifugal separator: ADS-250MS (number of revolutions: 10000 rpm) manufactured by Saito Separator Limited) at a flow rate of 600 g/min to perform solid-liquid separation. A clear liquid obtained at this time was recovered and used as a hydrogenation raw material. The turbidity of the hydrogenation raw material at 25° C. was 10.0 NTU.

(Catalytic Activity Decreasing Rate)

In a step corresponding to the first-stage hydrogenation step in Example 1, the residual olefin concentration when the passing resin liquid amount was 22.7 [t-resin/m$^3$-cat] was calculated to be 3.76 [$^1$H-NMR area %] and the residual olefin concentration when the passing resin liquid amount was 281.7 [t-resin/m$^3$-cat] was calculated to be 4.18 [$^1$H-NMR area %]. From these, the catalytic activity decreasing rate was estimated to be 0.0015 [($^1$H-NMR area %)/(t-resin/m$^3$-cat)]. The results are shown in the below-mentioned Table 1.

Example 3: Production Example of Hydrogenated Petroleum Resin (4)

<Solid-Liquid Separation by Filtration>

A hydrogenated petroleum resin was produced in the same manner as in Example 1 except that the following solid-liquid separation by filtration was performed as the method for removing the DCPD oligomer.

(Removal of DCPD Oligomer by Solid-Liquid Separation Through Filtration)

A solution obtained by diluting the thermal polymerization reaction product to a concentration of 15.0 mass % by adding DMCH thereto was cooled to a temperature of 25° C. to deposit a DCPD oligomer. A dried celite aid was mixed therein, and the resulting mixture was applied to a 360-mesh wire net, and the diluted solution was allowed to pass therethrough, whereby the DCPD oligomer was separated by filtration. A filtrate obtained at this time was recovered and used as a hydrogenation raw material. The turbidity of the hydrogenation raw material at 25° C. was 0.97 NTU. The results are shown in the below-mentioned Table 1.

Example 4: Production Example of Hydrogenated Petroleum Resin (5)

<Adsorption>

A hydrogenated petroleum resin was produced in the same manner as in Example 1 except that an adsorbent was used as the method for removing the DCPD oligomer.

(Removal of DCPD Oligomer by Adsorption)

A solution obtained by diluting the thermal polymerization reaction product to a concentration of 15.0 mass % by adding DMCH thereto was allowed to pass through spherical activated alumina in a particulate form with a size of 2 to 4 mm (KHD-24, manufactured by Sumika Alchem Co., Ltd.) at an LHSV of 2.0 [h$^{-1}$] using a fixed bed flow reactor. The temperature and the pressure in an adsorption tower at this time were 120° C. and 0.5 MPa, respectively. The obtained adsorbed liquid after allowing the solution to pass therethrough was recovered and used as a hydrogenation raw material. The turbidity of the hydrogenation raw material at 25° C. was 7.4 NTU. The results are shown in the below-mentioned Table 1.

TABLE 1

| | Example 1 | Comparative Example 1 | Example 2 | Example 3 | Example 4 |
|---|---|---|---|---|---|
| Method for removing DCPD oligomer | Solid-liquid separation by natural sedimentation | non | Solid-liquid separation by centrifugal sedimentation | Solid-liquid separation by filtration | Adsorption |
| Turbidity at 25° C. of hydrogenation raw material (NTU) | 0.56 | 24.0 (thermal polymerization reaction product) | 10.0 | 0.97 | 7.4 |
| Catalytic activity decreasing rate ($^1$H-NMR area %)/(t-resin/m$^3$-cat) | 0.0012 | 0.0026 | 0.0015 | — | — |

From the results of Example 1, it was confirmed that when the removal of the DCPD oligomer is sufficient, the turbidity of the hydrogenation raw material is extremely low, the catalytic activity decreasing rate in the hydrogenation step is small, and efficient production of the hydrogenated petroleum resin can be performed. Further, from the results of Comparative Example 1, when the DCPD oligomer is not removed, the turbidity of the thermal polymerization reaction product is 24.0 NTU, which is extremely high, the catalytic activity decreasing rate in the hydrogenation step is high, and a decrease in catalytic activity is likely to occur, and therefore, it was determined that efficient production cannot be performed.

From the results of Example 2, it was confirmed that even when the turbidity of the hydrogenation raw material is a little higher than that of Example 1, the catalytic activity decreasing rate in the hydrogenation step is substantially equal to that of Example 1. Further, from the results of Example 3 and Example 4, it was confirmed that the method for removing the DCPD oligomer by solid-liquid separation through filtration or using an adsorbent is also an effective means. In addition, it was revealed that when the hydrogenation raw materials obtained in Example 1 to Example 4 were used, filter clogging can be avoided.

INDUSTRIAL APPLICABILITY

According to the method of the present invention, by removing a DCPD oligomer from a thermal polymerization reaction product obtained by thermal polymerization of a reaction product of a dicyclopentadiene and a vinyl aromatic compound, filter clogging is not caused in the production step thereafter, and also a decrease in catalytic activity in the hydrogenation step can be suppressed. Therefore, the present invention is useful as a method for industrially advantageously producing a dicyclopentadiene/vinyl aromatic compound-based hydrogenated petroleum resin having favorable physical properties as a tackifier.

The invention claimed is:

1. A method of producing a dicyclopentadiene/vinyl aromatic compound-based hydrogenated petroleum resin, the method comprising:
    subjecting a reaction product obtained by reacting a dicyclopentadiene with a vinyl aromatic compound to thermal polymerization, to obtain a thermal polymerization reaction product; and then
hydrogenating the thermal polymerization reaction product,
wherein, as the thermal polymerization reaction product, an oligomer-removed thermal polymerization reaction product is obtained by removing a dicyclopentadiene oligomer from the thermal polymerization reaction product and used as a hydrogenation raw material, and
wherein the hydrogenation raw material is obtained by removing the dicyclopentadiene oligomer by contacting the dicyclopentadiene oligomer in the thermal polymerization reaction product with an adsorbent.

2. The method of claim 1, wherein the hydrogenation raw material is obtained by
cooling the thermal polymerization reaction product to 10 to 40° C., to obtain a deposited material, and
removing the dicyclopentadiene oligomer by performing solid-liquid separation of the deposited material.

3. The method of claim 1, wherein the adsorbent is at least one type selected from the group consisting of an activated clay, a silica gel, a silica-alumina, an activated alumina, an activated carbon, a zeolite, and a diatomaceous earth.

4. The method of claim 1, wherein the hydrogenation raw material has a turbidity at 25° C. of 12 NTU or less.

5. The method of claim 1, wherein the hydrogenating uses a palladium-supported catalyst.

6. The method of claim 1, wherein the vinyl aromatic compound is a compound represented by formula (1):

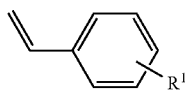

(1)

wherein $R^1$ is a hydrogen atom, an alkyl group, a cycloalkyl group, an aryl group, or an aralkyl group, and
the reaction product is a material comprising a phenylnorbornene derivative represented by formula (2):

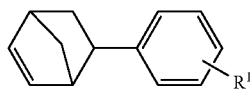

(2)

wherein $R^1$ is a hydrogen atom, an alkyl group, a cycloalkyl group, an aryl group, or an aralkyl group.

7. The method of claim 1, wherein the adsorbent comprises activated clay, a silica gel, a silica-alumina, an activated alumina, an activated carbon, a zeolite, a diatomaceous earth, or a mixture of two or more of any of these.

8. A method of producing a dicyclopentadiene/vinyl aromatic compound-based hydrogenated petroleum resin, the method comprising:
subjecting a reaction product obtained by reacting a dicyclopentadiene with a vinyl aromatic compound to thermal polymerization, to obtain a thermal polymerization reaction product; and then
hydrogenating the thermal polymerization reaction product,
wherein, as the thermal polymerization reaction product, an oligomer-removed thermal polymerization reaction product is obtained by removing a dicyclopentadiene oligomer from the thermal polymerization reaction product and used as a hydrogenation raw material, and
wherein the vinyl aromatic compound is of formula (1):

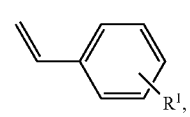

(1)

wherein $R^1$ is a hydrogen atom, an alkyl group, a cycloalkyl group, an aryl group, or an aralkyl group, and
wherein the reaction product comprises a phenylnorbornene of formula (2):

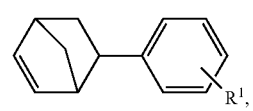

(2)

wherein $R^1$ is a hydrogen atom, an alkyl group, a cycloalkyl group, an aryl group, or an aralkyl group.

9. The method of claim 8, wherein the hydrogenation raw material is obtained by
cooling the thermal polymerization reaction product to a temperature in a range of from 10 to 40° C., to obtain a deposited material, and
removing the dicyclopentadiene oligomer by performing solid-liquid separation of the deposited material.

10. The method of claim 8, wherein the adsorbent is at least one type selected from the group consisting of an activated clay, a silica gel, a silica-alumina, an activated alumina, an activated carbon, a zeolite, and a diatomaceous earth.

11. The method of claim 8, wherein the adsorbent comprises activated clay, a silica gel, a silica-alumina, an activated alumina, an activated carbon, a zeolite, a diatomaceous earth, or a mixture of two or more of any of these.

12. The method of claim 8, wherein, in the phenylnorbornene of formula (2), $R^1$ is a hydrogen atom.

13. The method of claim 8, wherein, in the phenylnorbornene of formula (2), $R^1$ is an alkyl group.

14. The method of claim 8, wherein, in the phenylnorbornene of formula (2), $R^1$ is a cycloalkyl group.

15. The method of claim 8, wherein, in the phenylnorbornene of formula (2), $R^1$ is a cycloalkyl group.

16. The method of claim 8, wherein, in the phenylnorbornene of formula (2), $R^1$ is an aryl group.

17. The method of claim 8, wherein, in the phenylnorbornene of formula (2), $R^1$ is an aralkyl group.

18. The method of claim 8, wherein the hydrogenation raw material has a turbidity at 25° C. of 12 NTU or less.

19. The method of claim 8, wherein the hydrogenating uses a palladium-supported catalyst.

20. The method of claim 8, wherein the adsorbent comprises an activated alumina.

* * * * *